This invention relates to apparatus for measuring elevated temperatures of fluids and more particularly to such apparatus which is maintained at a temperature lower than that of a fluid whose temperature is being measured.

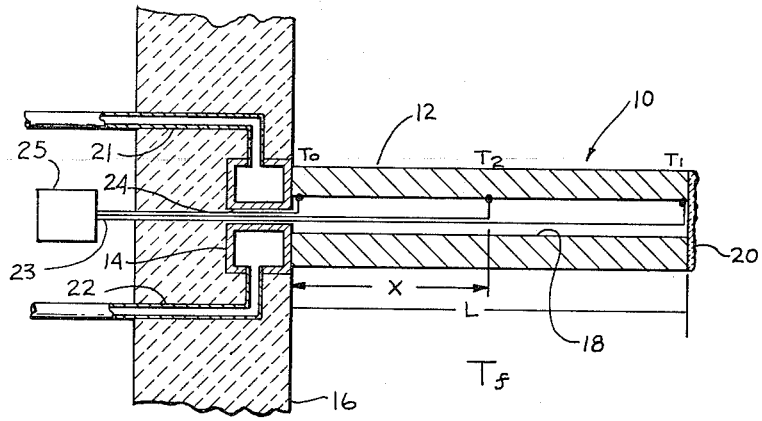
FIG. 1.
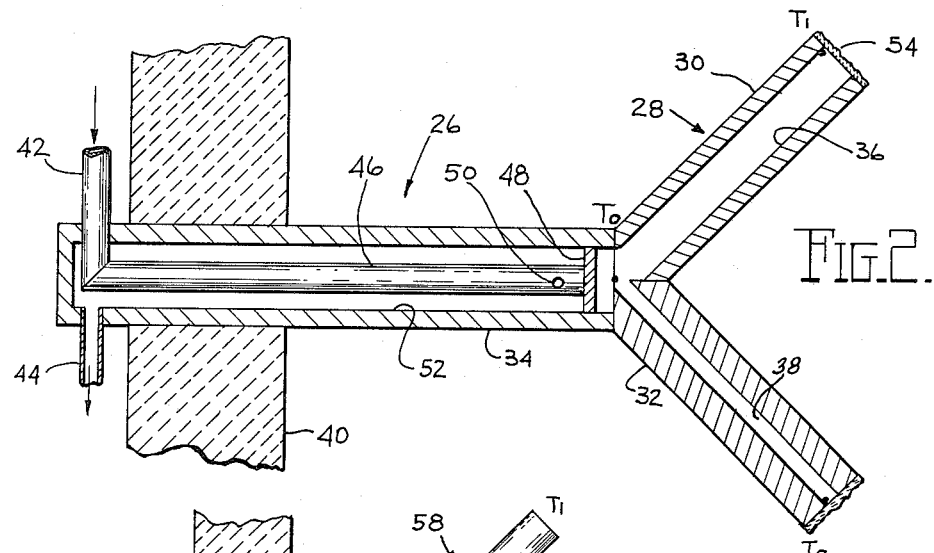
FIG. 2.
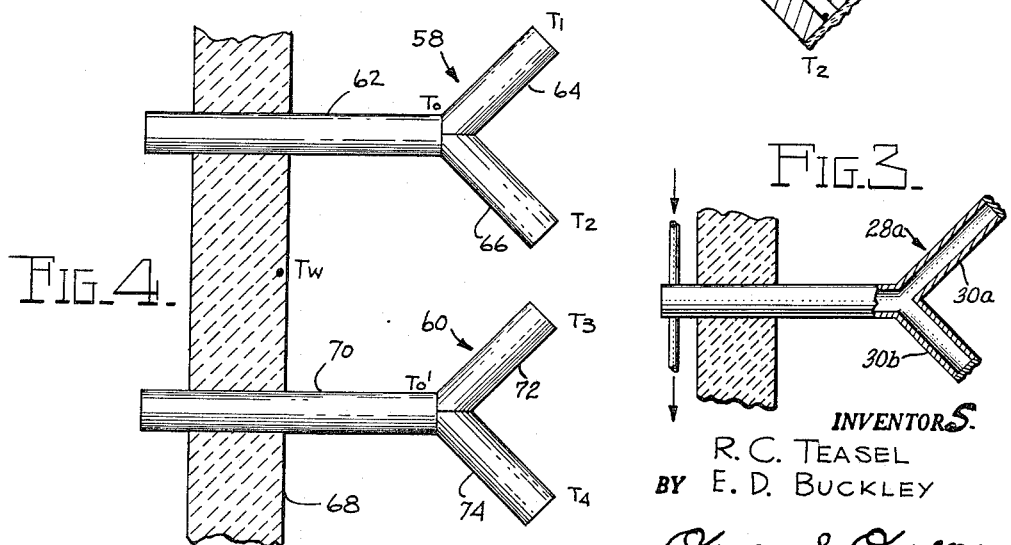
FIG. 3.
FIG. 4.
INVENTORS.
R. C. TEASEL
BY E. D. BUCKLEY
Owen & Owen
ATTORNEYS 3,095,743
APPARATUS FOR MEASURING ELEVATED TEMPERATURES
Richard C. Teasel, Sylvania, and Edward D. Buckley, Toledo, Ohio, assignors to Champion Spark Plug Company, Toledo, Ohio, a corporation of Delaware
Filed Dec. 18, 1959, Ser. No. 860,603
7 Claims. (Cl. 73—339)

Temperatures in excess of approximately 3000° F. are difficult to measure because the materials of which most temperature measuring devices are made, such as platinum and rhodium in thermocouples, will not readily withstand such temperatures for any length of time, nor will such devices produce reasonably accurate temperature measurements at very high temperatures. While instruments such as optical pyrometers can be used to measure very high temperatures, the degree of accuracy of readings obtained therefrom varies widely; further, these instruments do not measure the temperatures of most gases but only the temperatures of the walls of chambers containing the gases. Other devices for measuring extremely high temperatures are limited to certain laboratory applications because of their high cost, size, and complexity or high degree of skill required to operate them correctly.

The present invention is based upon the discovery that the temperature of a fluid can be measured by means maintained at temperatures below that of the fluid. Thus, a probe can be inserted into the fluid with a base of the probe being cooled to maintain it at a temperature below that of the fluid, and means can be provided for measuring the probe temperature at two spaced points and at the base. By thus taking three readings, all of which are below the true temperature of the fluid, the true fluid temperature can be determined with the aid of known equations. Because the probe is cooled, it can be placed in a fluid at a higher temperature, above that which the probe is capable of withstanding, and the cooled probe can be maintained indefinitely in the fluid. The probe and the equipment for measuring its temperature at the spaced points are relatively inexpensive and are of such size as to be usable in commercial applications. Further, calibration tables or graphs can be employed to enable the device to be employed by technicians of average skill.

It is, therefore, a principal object of the invention to provide an improved temperature measuring device for measuring temperatures greatly higher than that of the device itself.

A further object of the invention is to provide a temperature measuring device for measuring very high temperatures, which device is sufficiently simple and inexpensive that it can be employed in commercial applications.

Other objects and advantages of the invention will be apparent from the following detailed description of preferred embodiment thereof, reference being made to the accompanying drawing, in which:

FIG. 1 is a somewhat diagrammatic view in cross section of a straight temperature measuring probe with a coolant chamber for cooling the base of the probe in accordance with the principles of the invention;

FIG. 2 is a view in cross section of a probe similar to that shown in FIG. 1 but of Y shaped configuration;

FIG. 3 is a somewhat schematic view similar to FIG. 2, but with parts broken away and with parts in cross section, of a slightly modified probe; and FIG. 4 is an elevational view of two probes, similar to the probe of FIG. 2, used in side-by-side relationship.

Referring to the drawing, and more particularly to FIG. 1, a temperature measuring device according to the invention is indicated at 10 and includes a hollow probe or tubular body member having means for maintaining the temperature of the base substantially different than the temperature of the fluid being measured, in this instance a cooling chamber 14. The probe 12 extends outwardly from a wall 16 into a chamber partially defined by the wall 16, which chamber contains a fluid at an elevated temperature which is to be measured by the device. The probe 12 can be made of any suitable, heat-conducting material, preferably of a highly refractory nature, and preferably with uniform conductivity throughout its length, when at a given temperature. A bore 18 is formed through the length of the probe concentrically with the outer surface thereof and is of uniform, known diameter throughout the length of the probe. The outer end of the probe is covered with a suitable insulating cap 20, of refractory cement, for example, to prevent substantially any heat transfer between the fluid and the end of the probe. The cooling chamber 14 has an inlet 21 and an outlet 22 through which a suitable coolant is passed for removing heat from the base of the probe 12 to maintain the entire probe at a temperature lower than that of the fluid to be measured.

The temperature of the probe 12 is measured at three spaced points, one, $T_0$, being at the base and the other two, $T_1$ and $T_2$, being at other portions of the probe. One of the latter two points is preferably at the outer end of the probe and the other at an intermediate portion thereof. The temperatures at these points can be measured by any suitable means, such as conventional thermocouples, because these temperatures can be maintained at reasonably low levels which thermocouples or the like can withstand. Wires 23 for the thermocouples can extend through the bore 18 and a passage 24 in the cooling chamber 14 to a conventional instrument 25 outside the wall 16 for converting the electric current generated by the thremocouples into temperature values.

The values obtained for temperatures $T_0$ and $T_1$ are then substituted in the following equation which represents heat transfer from a fluid to a body of uniform cross-sectional area and shape throughout its length:

(1) $$T_1 - T_f = (T_0 - T_f) \times 2\frac{(e^{mL})}{1 + e^{2mL}}$$

where:
$T_1$=temperature at end of probe.
$T_f$=temperature of the fluid.
$T_0$=temperature at base of probe.
$e$=base of natural logarithm, 2.71828
$L$=length of probe.

$$m = \sqrt{\frac{hp}{KA}}$$

$h$ = film coefficient of probe.
$p$ = perimeter of the probe.
$K$ = thermal conductivity of the probe material.
$A$ = cross-sectional area of the probe.

Similarly, temperatures $T_0$ and $T_2$ are inserted in the following equation:

$$(2) \quad T_2 - T_f = (T_0 - T_f)\left[\frac{e^{mx}}{1+e^{2mL}} + \frac{e^{-mx}}{1+e^{-2mL}}\right]$$

where:

$T_2$ = temperature at a point on probe spaced from the first point at which the temperature $T_1$ is measured.
$x$ = distance from base of probe to point at which temperature $T_2$ is measured.

All values in these equations are known except for $T_f$ and $m$. In the case of $m$, the film coefficient $h$, upon which $m$ is dependent, is quite difficult to determine. This coefficient depends, for example, upon the shape of the probe, the temperatures involved, the velocity and pressure of the fluid adjacent the probe, the degree of smoothness of the probe surface, and the material of which the probe is made. All of these factors affect the thin film of fluid on the surface of the probe 12, which film influences the probe temperature. The thermal conductivity $K$ is also difficult to determine accurately. However, the exponent $m$ and, therefore, the coefficient $h$ and conductivity $K$ can be eliminated from the Equations 1 and 2 by combining them to obtain the temperature $T_f$ of the fluid. Although it is not known how to solve these equations by exact mathematical analyses, the solution can be obtained graphically, by trial and error, or by successive approximations.

Because the conditions in the chamber defined by the walls 16 will tend to vary from the end of the probe 12 to the base thereof as the wall 16 is approached, these conditions including the temperature of the gas and the value of the film coefficient $h$, for example, it is preferred to measure the temperatures $T_1$ and $T_2$ at points equally spaced from the wall 16. For this purpose, a temperature measuring device 26 with a Y shaped probe 28 (FIG. 2) is provided. The probe 28 includes two probe arms 30 and 32 extending outwardly at an angle, for example of 90 degrees, from a base leg 34. The arms 30 and 32 have the same outer diameter and the same length and are made of the same material, the only difference in the two being that a bore 36 of the arm 30 is larger than a bore 38 of the arm 32, which changes the cross-sectional areas $A$ of the arms. Rather than changing the bore diameters, the outer diameters, the lengths, or the materials of which the probes are made can be changed, although any change except for the bore diameters will change the film coefficients $h$ and/or the emissivity. Hence, change in the bore diameters to change the cross-sectional areas is preferred, although any change which will vary the exponent $m$ or the product of $mL$ can be used. The base leg 34 preferably extends completely through a wall 40 where it is provided with a coolant inlet 42 and a coolant outlet 44. The inlet 42 connects to an inner, concentric tube 46 which extends to a partition 48 near the outer end of the leg 34 and has holes 50 near the partition for the passage of the coolant from the tube 46 to an annular chamber 52 defined between the tube 46 and the inner surface of the leg 34. The coolant then flows back through the leg 34 to the outlet 44.

The base temperature $T_0$ is measured at the junction of the arms 30 and 32 with the base leg 34 and the temperatures $T_1$ and $T_2$ are measured at the outer ends of the arms 30 and 32, respectively. This can be accomplished by thermocouples, the wires of which can extend through the chamber 52 to an instrument outside the wall 40. These temperatures are then inserted in Equation 1 twice, using $T_1$ in one instance and $T_2$ in the second instance, each with the temperature $T_0$. The ratio of the exponents $m$ are known in these two equations, being dependent on the cross-sectional areas $A$, which are known. The unknown $m$ dependent upon the film coefficient $h$ can then be eliminated and the fluid temperature $T_f$ determined. Of course, two separate probes similar to the probe 12 can be employed rather than the Y shaped probe 28 with the two probe arms 30 and 32 having the common base. However, the common base and common base temperature $T_0$ simplify the mathematics involved somewhat and require the measurement of only three temperatures rather than four.

Although radiation of the fluid will be of importance only for hetera-polar gases with wide emission bands, for example, hydrocarbons, alcohols, carbon dioxide, carbon monoxide, and water vapor, the radiation of the wall defining the chamber containing the fluid is often a very influential factor on the temperature measurement for almost any type of fluid. The wall radiation in the above-described embodiments of the invention can be taken into account for any given set of conditions by experimentally determining the effect of the radiation and by correcting the temperature reading in accordance with this effect. In practice, graphs or charts can be used to determine quickly the true fluid temperature from the calculated one. However, the effect of wall radiation can be eliminated by employing a radiation shield around a probe, which shield is also cooled by the base cooling chamber for the probe. The radiation shield, which will then be at substantially the same temperature as the probe, will thereby prevent the influence of radiation from the chamber walls.

FIG. 3 schematically shows a slightly modified Y shaped probe 28a having probe arms 30a and 32a of the same cross sectional area but of different lengths, as previously discussed.

The effect of radiation can also be accounted for by employing near one another two Y shaped probes 58 and 60 (FIG. 4), each of which is basically similar to the probe 28, except for the cooling means employed. In this instance, the cooling means comprises a heat-conducting bar 62 connecting the base of two probe arms 64 and 66 with a cool environment outside a chamber wall 68 and a heat-conducting bar 70 is provided for the base of two probe arms 72 and 74. For the first probe 58, a temperature $T_0$ is measured at the base of the two probe arms 64 and 66 and temperatures $T_1$ and $T_2$ are measured at the ends of these arms. For the second probe 60, a temperature $T_0'$ is measured at the base of the two probe arms 72 and 74 and temperatures $T_3$ and $T_4$ are measured at the ends of these arms. The four arms have different sized bores to vary the cross-sectional areas thereof. Calculated fluid temperatures $T_{fI}$ and $T_{fII}$ can be obtained for each of the probes 58 and 60 by means of Equation 1, in the same manner as is done for the probe 28 of FIG. 2. A temperature $T_w$ of the wall 68 is also measured, preferably at a point between the two probes or wherever is necessary to obtain the most representative temperature of the wall. In some instances, the temperature $T_w$ might be taken at several points and the average used, particularly when this temperature varies widely. The calculated gas temperature $T_{fI}$ for the first probe 58 and the wall temperature $T_w$ are then inserted in the following equation:

$$(3) \quad T_{fI} = T_{ft} + \frac{Es}{h}(T_w^4 - T_{I\,avg.}^4)$$

where:

$T_{fI}$ = calculated temperature for the first probe.
$T_w$ = wall temperature.
$T_{I avg.}$ = average temperature of the first probe, based on the temperatures measured at the extremities.
$T_{ft}$ = true fluid temperature.
$s$ = Stefan-Boltzmann constant.
$E$ = emissivity.

The calculated gas temperature $T_{fII}$ for the second probe 60 and the wall temperature $T_w$ are substituted in the following equation:

(4) $$T_{fII} = T_{ft} + \frac{Es}{h}(T_w^4 - T_{II\,avg.}^4)$$

where:

$T_{fII}$ = calculated temperature for the second probe.
$T_{II\,avg.}$ = average temperature of the second probe, based on the temperatures measured at the extremities.

The terms $$\frac{Es}{h}$$

can be solved in the following equation:

(5) $$T_{fI} - T_{fII} = \frac{Es}{h}(T_{II\,avg.}^4 - T_{I\,avg.}^4)$$

and substituted in Equations 3 and 4. The true gas temperature $T_{ft}$ can then be obtained with the radiation factor fully accounted for.

Rather than two Y shaped probes, one three-armed or four-armed probe or three or four separate probes could be employed for the above purpose. Also, it may be noted that the probe according to the invention can be used to measure low temperatures in which case heat will be supplied to the base to maintain it at a temperature substantially different than the temperature of the fluid being measured.

By way of further illustration, and not limitation, a temperature measuring device according to the device 26 of FIG. 2 has been made according to the following specifications: The base leg 34 and the arms 30 and 32 were made of Chromel A tubing, the base leg 34 having an outer diameter of ¼" and the arms 30 and 32 having outer diameters of ⅛ inch, with a layer of cement on the outer ends of the tubing forming the arms 30 and 32. These arms were each 1⅛ inches long with the arm 30 having a bore of 0.090 inch and the arm 32 having a bore of 0.060 inch. The base leg 34 extended outwardly, from the wall 40 a distance of about 2 inches with the arms 30 and 32 joined to it by silver solder. For cooling purposes, a brass tube with an inner diameter of 0.060 inch was used for the tube 46, the inner diameter of the leg 34 being 3/16 inch. Thermocouples were used to measure the temperatures of the arm 30 at the bore 36 adjacent the outer end, the arm 32 at the bore 38 adjacent the outer end, and at the end of the base leg 34 where the two legs 30 and 32 met.

Various modifications of the invention will be apparent from the above detailed description and from the accompanying drawings. Such modifications will fall within the scope of the invention if within the scope and tenor of the appended claims.

What we claim:

1. A device for measuring temperature of a fluid comprising two elongate arms extending from a common base, said arms being of heat-conducting material, and each of said arms being of uniform cross section throughout its length, said arms being of equal length and of different cross-sectional area, a base member joining said arms at the common base, means adjacent the base for maintaining its temperature substantially different than the temperature of the fluid being measured, and means for measuring the temperatures at an end of each arm and at the base.

2. A device for measuring temperatures of fluids comprising two pair of elongate arms, each pair extending at diverging angles from a common base, said arms being of heat-conducting material, and of uniform cross section throughout their lengths, each pair of said arms being of equal length and of different cross-sectional area, a base member joining each pair of arms at the common base, means for cooling said base members, means for measuring the temperatures at an end of each arm and at the bases, and means for measuring the temperature of the wall near said base members.

3. A device for measuring temperature of a fluid comprising two elongate arms adapted to extend into a chamber containing the fluid, each of said arms including a base and an end, means for maintaining the temperature of the base substantially different than the temperature of the fluid being measured, means for measuring the temperature of the base, means for measuring the temperature at a point on each of said arms spaced from the base, the value of $mL$ for that portion of the first arm between the first point and the base being different than the value of $mL$ for that portion of the second arm between the second point and the base where:

$L$ = the distance between the point at which the temperature is measured and the base $$m = \sqrt{\frac{hp}{KA}}$$

$h$ = film coefficient of that portion of the arm between the point at which the temperature is measured and the base $p$ = perimeter of that portion of the arm between the point at which the temperature is measured and the base $K$ = thermal conductivity of that portion of the arm between the point at which the temperature is measured and the base $A$ = cross-sectional area of that portion of the arm between the point at which the temperature is measured and the base.

4. A device for measuring temperature of a fluid comprising two elongate arms of equal length adapted to extend into a chamber containing the fluid, said arms including ends and a common base, means for maintaining the temperature of said base substantially different than the temperature of the fluid being measured, means for measuring the temperature of said base, means for measuring the temperature at a point at the end of each of said arms spaced from said base, the value of $m$ for the first arm being different than the value of $m$ for the second arm where:

$$m = \sqrt{\frac{hp}{KA}}$$

$h$ = film coefficient of the arm
$p$ = perimeter of the arm
$K$ = thermal conductivity of the arm
$A$ = cross-sectional area of the arm.

5. A device for measuring temperatures of fluids, said device comprising a probe including two elongate arms, said arms being of heat conducting material and of different cross-sectional area, means adjacent the base for maintaining its temperature substantially different than the temperature of the fluid being measured, means for measuring a first temperature at said base, means for measuring a second temperature at a point on one of said arms spaced a known distance from said base, and means for measuring a third temperature on the other of said arms at a second point spaced from said base a distance equal to the distance between the first point and said base.

6. A device according to claim 5 including a second probe similar to and near the first, means for measuring three temperatures on said second probe at points corresponding to the three points on said first probe, and means for measuring the temperature of the wall of said chamber near said probes.

7. A device for measuring temperature of a fluid comprising two elongate arms extending from a common base, said arms being of heat-conducting material, each of said arms being of uniform cross-section throughout its length, said arms being of different lengths and of the same cross-sectional area, a base member joining said arms at the common base, means adjacent the base for maintaining its temperature substantially different from the temperature of the fluid being measured, and means for measuring the temperatures at an end of each arm and at the base.

References Cited in the file of this patent

UNITED STATES PATENTS

| | | |
|---|---|---|
| 764,175 | Bristol | July 5, 1904 |
| 1,156,317 | Santos et al. | Oct. 12, 1915 |
| 1,869,151 | Jeffrey et al. | July 26, 1932 |
| 2,681,573 | Brown | June 22, 1954 |
| 3,015,234 | Springfield | Jan. 2, 1962 |

FOREIGN PATENTS

| | | |
|---|---|---|
| 1,057,575 | France | Oct. 28, 1953 |
| 756,963 | Great Britain | Sept. 12, 1956 |